United States Patent
Stjernholm

(10) Patent No.: US 10,271,228 B2
(45) Date of Patent: Apr. 23, 2019

(54) SYSTEMS AND METHODS FOR AUTOMATICALLY ASSIGNING AN AREA CODE TO A RADIO ACCESS NETWORK (RAN) NODE

(71) Applicant: Telefonaktiebolaget LM Ericsson (publ), Stockholm (SE)

(72) Inventor: Paul Stjernholm, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 29 days.

(21) Appl. No.: 15/522,036

(22) PCT Filed: May 23, 2016

(86) PCT No.: PCT/SE2016/050477
§ 371 (c)(1),
(2) Date: Apr. 26, 2017

(87) PCT Pub. No.: WO2017/204701
PCT Pub. Date: Nov. 30, 2017

(65) Prior Publication Data
US 2018/0192302 A1    Jul. 5, 2018

(51) Int. Cl.
*H04W 36/30* (2009.01)
*H04W 24/02* (2009.01)

(52) U.S. Cl.
CPC ................... *H04W 24/02* (2013.01)

(58) Field of Classification Search
CPC ..................................... H04W 24/02
See application file for complete search history.

(56) References Cited

U.S. PATENT DOCUMENTS

| 2013/0064226 A1* | 3/2013 | Dinan | H04W 36/30 370/332 |
| 2016/0192261 A1* | 6/2016 | Wang | H04W 36/0055 370/331 |
| 2016/0249259 A1* | 8/2016 | Park | H04W 36/00 |

FOREIGN PATENT DOCUMENTS

| EP | 2109327 A1 | 10/2009 |
| WO | 2013103311 A1 | 7/2013 |

OTHER PUBLICATIONS

International Search Report and Written Opinion dated Feb. 14, 2017 in International Application No. PCT/SE2016/050477, 12 pages.

* cited by examiner

*Primary Examiner* — Pakee Fang
(74) *Attorney, Agent, or Firm* — Rothwell, Figg, Ernst & Manbeck, p.c.

(57) ABSTRACT

Automatically assigning an area code to a first radio access network (RAN) node by obtaining, at one time or over a period of time, wireless communication device (WCD) area code measurement information generated by one or more WCDs based on the detection of one or more signals transmitted by one or more RAN nodes neighboring the first RAN node; using the WCD area code measurement information to select an area code for the first RAN node; and assigning the selected area code to the first RAN node.

23 Claims, 7 Drawing Sheets

US 10,271,228 B2

SYSTEMS AND METHODS FOR AUTOMATICALLY ASSIGNING AN AREA CODE TO A RADIO ACCESS NETWORK (RAN) NODE

CROSS-REFERENCE TO RELATED APPLICATION(S)

This application is a 35 U.S.C. § 371 National Stage of International Patent Application No. PCT/SE2016/050477, filed May 23, 2016, and designating the United States.

TECHNICAL FIELD

Aspects of this disclosure relate to systems and methods for assigning an area code to a radio access network (RAN) node.

BACKGROUND

An area code (e.g., a Tracking Area Code (TAC) or other area code) identifies an area within a network. Each RAN node (e.g., base station) is assigned an area code and frequently broadcasts (or otherwise transmits) the area code assigned to it so that a wireless communication device (WCD) within the vicinity of a RAN node can receive the area code assigned to the RAN node. This information allows the WCD to determine whether it has moved into a new area. When a WCD determines that it has moved into a new area, the WCD typically performs a location update to information a network node within the network of the WCD's current location.

SUMMARY

It is advantageous to automatically assign area codes to RAN nodes (e.g., recently deployed RAN nodes). This disclosure provides systems and methods for automatically assigning an area code to a RAN node.

In one aspect a method for automatically assigning an area code to a first radio access network, RAN, node, is provided. In some embodiments, the area code is a tracking area code (TAC) for use by RAN nodes and/or core network nodes in tracking the geographic location of WCDs.

In some embodiments, the method includes obtaining, at one time or over a period of time, wireless communication device, WCD, area code measurement information generated by one or more WCDs based on the detection of one or more signals transmitted by one or more RAN nodes neighboring the first RAN node. The method further includes using the WCD area code measurement information to select an area code for the first RAN node. The method further includes assigning the selected area code to the first RAN node.

In some embodiments, the WCD area code measurement information comprises a plurality of area code identifiers, wherein each area code identifier included in the plurality area code identifiers is an area code of a neighboring RAN node that neighbors the first RAN node or an identifier that can be used to identify an area code of a neighboring RAN node that neighbors the first RAN node.

In some embodiments, each area code identifier included in the plurality of area code identifiers is one of: a cell identifier identifying a cell of a cellular network, a node identifier identifying a RAN node, an antenna identifier identifying an antenna transmission point, and an area code.

In some embodiments, the step of obtaining the WCD measurement information comprises the first RAN node receiving, over a period of time, a plurality of area code measurement reports, wherein each one of the area code measurement reports was transmitted by a WCD after the WCD received reporting information transmitted by the first RAN node.

In some embodiments, the first RAN node uses the WCD area code measurement information to select the area code, the first RAN node assigns the selected area code to itself, and the first RAN node informs another node that the first RAN node has assigned the selected area code to itself.

In some embodiments, the step of obtaining the WCD area code measurement information comprises a server receiving the WCD measurement information from the first RAN node and the server performs the step of using the WCD measurement information to select the area code for the first RAN node.

In some embodiments, a temporary area code is assigned to the first RAN node before the selected area code is assigned to the first RAN node. In such embodiments, assigning the selected area code to the first RAN node comprises a server transmitting to the first RAN node an instruction for causing the first RAN node to cease using the temporary area code and begin using the selected area code. In some embodiments, the method further includes the first RAN node receiving from a server an instruction for causing the first RAN node to cease using the temporary area code and begin using the assigned area code.

In some embodiments, the step of using the WCD measurement information to select an area code comprises: determining T1, wherein T1 is the total number of area code identifiers included in the plurality of area code identifiers that identifies a first area code; determining T2, wherein T2 is the total number of area code identifiers included in the plurality of area code identifiers that identifies a second area code; and determining whether T1 is greater than T2. For example, in some embodiments, the plurality of area code identifiers identify N different area codes and the method comprises determining Max (Ti), i=1, 2, . . . , N, where Ti is the total number of area code identifiers included in the plurality of area code identifiers that identifies the ith area code.

In some embodiments, each area code identifier included in the plurality of area code identifiers is one of: a cell identifier identifying a cell of a cellular network, a node identifier identifying a RAN node, and an antenna identifier identifying an antenna transmission point, the step of using the WCD measurement information to select an area code comprises selecting an area code identifier included in the plurality of area code identifiers, and the method further comprises the first RAN node, after selecting the area code identifier, transmitting to a server an area code request requesting an area code corresponding to the selected area code identifier.

In some embodiments, the method further comprises the first RAN node broadcasting system information comprising the reporting information.

In some embodiments, the method further comprises the first RAN node transmitting a specific WCD a control message comprising reporting information for the specific WCD.

BRIEF DESCRIPTION OF THE DRAWINGS

The accompanying drawings, which are incorporated herein and form part of the specification, illustrate various embodiments.

DETAILED DESCRIPTION

Figure 1:
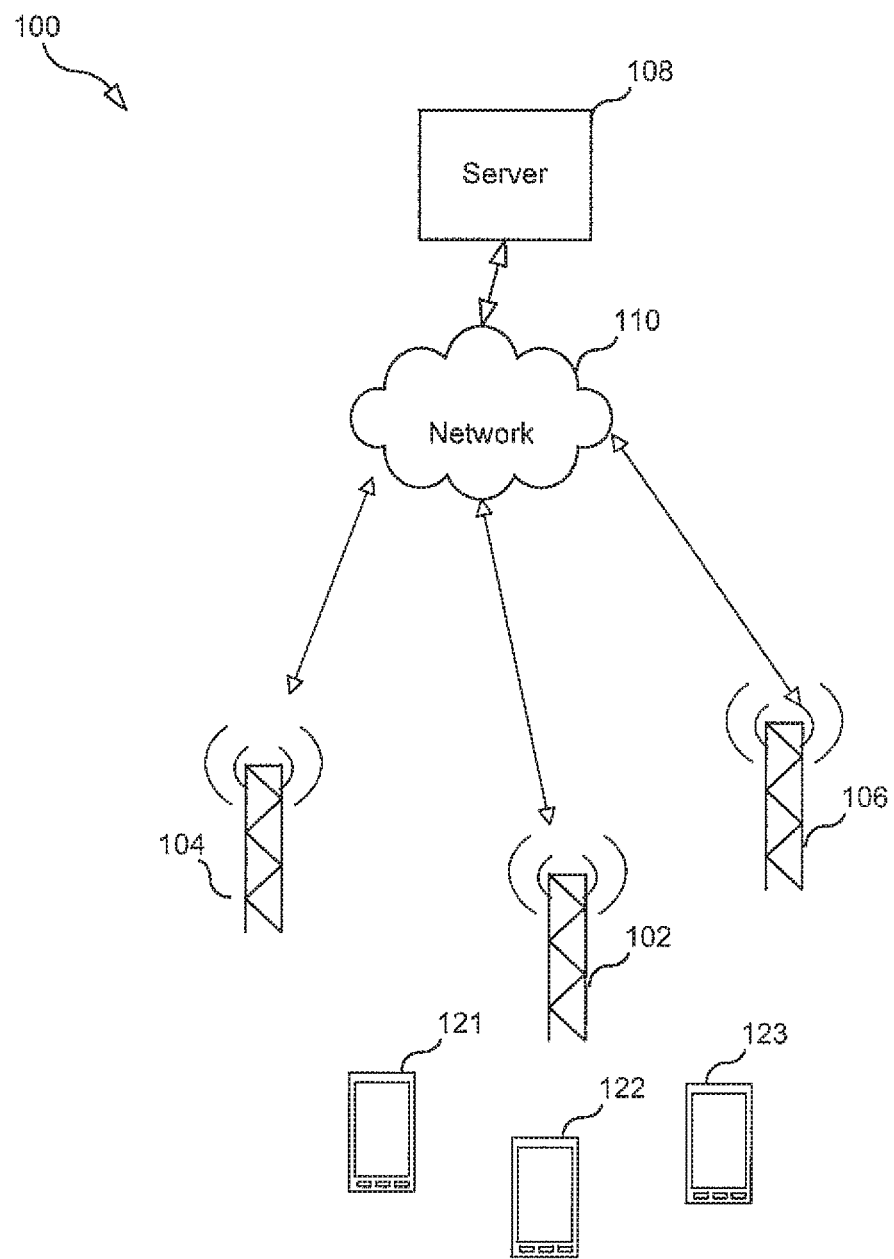
FIG. 1 illustrates a system according to some embodiments.

FIG. 1 illustrates a system 100 according to one embodiment. System 100 includes a plurality of RAN nodes (three RAN nodes are shown, RAN node 102, RAN node 104, and RAN node 106), a server 108, and a network 110 through which the RAN nodes can communicate with server 108. RAN nodes are configured to communicate with a wireless communication device (WCD) via an "air interface" (e.g., a radio-based communication channel). In the example system 100, three WCDs are shown (WCD 121, WCD 122, and WCD 123). In practice, system 100 includes numerous RAN nodes communicating with numerous WCDs.

To illustrate the various embodiments for automatically assigning an area code to a RAN node, we shall assume for the sake of illustration that each of the RAN nodes 104 and 106 have already been assigned a non-temporary area code (e.g., a TAC), but RAN node 102 has not yet been assigned a non-temporary area code.

Figure 2:
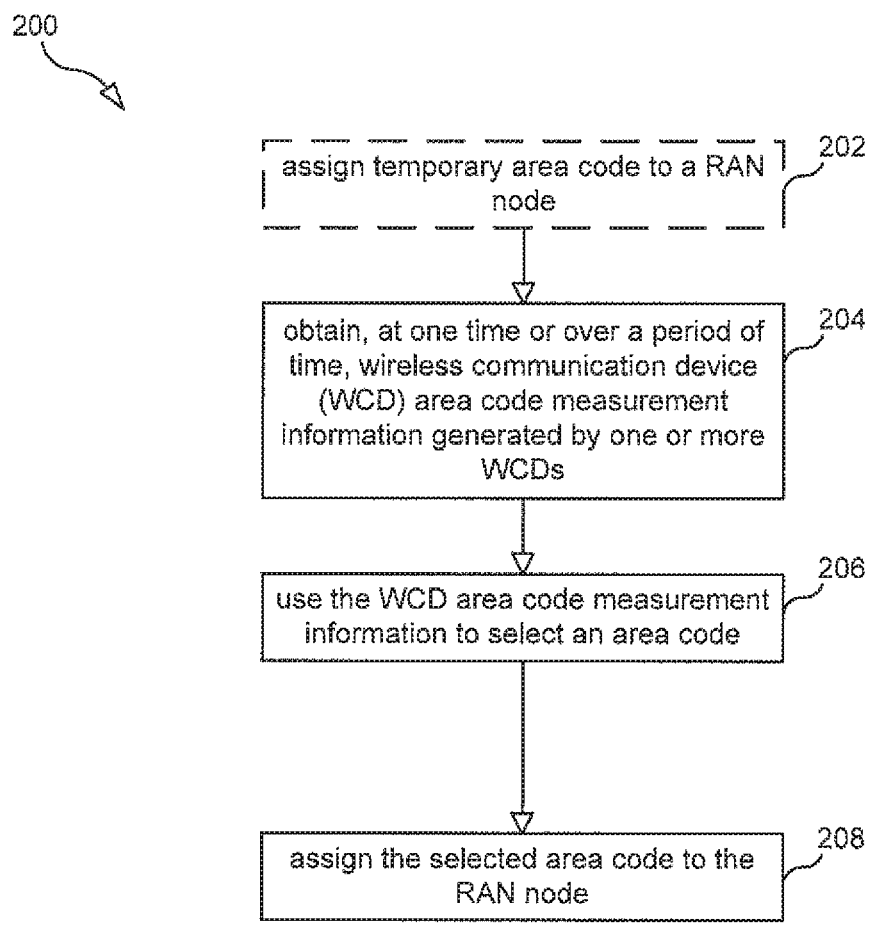
FIGS. 2-5 are flow charts illustrating various processes for selecting an area code to assign to a RAN node according to various embodiment.

Referring now to FIG. 2, FIG. 2 illustrates a process, performed by system 100 (e.g., performed by RAN node 102 and/or server 108), for automatically assigning an area code to RAN node 102. Process 200 may begin with step 202, wherein a temporary area code is assigned to RAN node 102. In some embodiments, this step is optional as indicated by the dashed lines.

In step 204, system 100 (e.g., RAN node 102 and/or server 108) obtains, at one time or over a period of time, WCD area code measurement information generated by one or more WCDs (e.g., generated by WCDs 121-123) based on the detection of one or more signals transmitted by one or more RAN nodes neighboring the RAN node 102. For example, in some embodiments, each of the WCDs 121-123 may be configured to detect a signal (e.g., a pilot signal, a synchronization signal, a reference signal, or other information) transmitted by at least one neighboring RAN node (e.g., RAN node 104 or 106) that neighbors RAN node 102 and to send to RAN node 102 a measurement report comprising WCD area code measurement information pertaining to the detected information. Such a report is referred to herein as an "area code measurement report." Each WCD may transmit an area code measurement report at different times. Hence, in one embodiment, RAN node 102 obtains the WCD area code measurement information over a period of time.

The WCD area code measurement information included in an area code measurement report may include signal quality (e.g. signal strength, signal to noise ratio (SNR), signal-to-interference-plus-noise ratio (SINR)) information for determining the quality of the detected signal. The WCD area code measurement information may further include an area code identifier associated with the signal quality information (e.g., the area code identifier may be an identifier assigned to the RAN node that transmitted the detected signal—i.e. the pilot signal, the synchronization signal, the reference signal, or other information, as mentioned above). In some embodiments, the area code identifier is an area code, and in other embodiments it is an identifier that can be used to identify an area code. In the latter case, the area code identifier could be one of: a cell identifier identifying a cell of a cellular network, a node identifier identifying a RAN node, an antenna identifier identifying an antenna transmission point, or the like. Hence, in some embodiments, the obtained WCD area code measurement information includes a plurality of area code identifiers, wherein each area code identifier included in the plurality area code identifiers is an area code of a neighboring RAN node that neighbors RAN node 102 or an identifier that can be used to identify an area code of a neighboring RAN node that neighbors the RAN node 102.

In step 206, the system 100 (e.g., RAN node 102 and/or server 108) uses the obtained WCD area code measurement information to select an area code. In some embodiments, system 100 selects the area code based not only on the WCD area code measurement information but also on a policy. And in step 208 the system 100 assigns the selected area code to RAN node 102. In embodiments where RAN node 102 performs method 200, RAN node 102 assigns the selected area code to itself. Additionally, after selecting the area code, RAN node may inform another node (e.g., server 108) that the RAN node 102 has assigned the selected area code to itself.

In some embodiments where process 200 is performed, at least in part, by server 109, the step of assigning the selected area code to the RAN node 102 includes server 108 transmitting to the RAN node 102 an instruction for causing the RAN node 102 to cease using the temporary area code previously assigned to RAN node 102 and begin using the selected area code.

In some embodiments, the step of obtaining the WCD area code measurement information includes server 108 receiving the WCD measurement information from the RAN node 102. For example, as explained above, RAN node 102 may, over a period of time, obtain from one or more WCDs one or more area code measurement reports. RAN node 102 may be configured to forward each such report (or at least the WCD area code measurement information included in the report) to server 108, which then receives the WCD area code measurement information. RAN node 102 may be configured to forward each area code measurement report at the time it is received at RAN node 102 or RAN node 102 may be configured to store received reports until a condition is met (e.g. a threshold number of reports have been received, a timer expired, or other condition). Upon determining that the condition is met (e.g., upon determining that the threshold number of reports have been received), RAN node 102 may transmit to server 108 all of the reports together so that server 108 receives the reports at generally the same time.

As discussed above, the obtained WCD area code measurement information may include a plurality of area code identifiers. In such embodiments, the step of using the WCD measurement information to select an area code comprises (or consists of) selecting an area code identifier from the plurality of area code identifiers. If the selected area code identifier is not itself an area code (e.g., the area code identifier is a node, cell or antenna identifier), then after the area code identifier is selected, the area code that can be identified by the area code identifier (e.g., an area code associated with area code identifier) is obtained. For example, in the case where RAN node 102 selects the area code identifier, RAN node 102 may transmit to server 108 a request for an area code, wherein the request includes the selected area code identifier (e.g., the selected cell, node or antenna identifier). The server 108 then uses the area code identifier included in the request to obtain the corresponding area code and transmits to RAN node a response to the request, which response includes the corresponding area code. The RAN node then begins using the area code and ceases using the temporary area code that was previously assigned to it.

In embodiments where the obtained WCD area code measurement information includes a plurality of area code identifiers, the step of selecting an area code identifier from the plurality of area code identifiers may include performing the following procedure: (1) determining T1, wherein T1 is the total number of area code identifiers included in the plurality of area code identifiers that identifies a first area code; (2) determining T2, wherein T2 is the total number of area code identifiers included in the plurality of area code identifiers that identifies a second area code; and (3) determining whether T1 is greater than T2. More generally, the procedure includes: determining Tn, for n=1, . . . , N, wherein N is the number of unique area codes identified by the plurality of area code identifiers and Tn is the total number of area code identifiers included the plurality of area code identifiers that identifies the nth area code; and determining max(T1, . . . , TN); and selecting the area code corresponding to max(T1, . . . TN). That is, for example, if T2 is the result of max(T1, . . . , TN), then the second area code identifier is the selected identifier and the area code corresponding to this identifier is assigned to RAN node 102.

In embodiments wherein each of one or more WCDs transmit to RAN node 102 one or more area code measurement reports, and each area code measurement report includes one more area code identifiers each of which is associated with a signal quality value, the step of selecting an area code identifier from the plurality of area code identifiers may include performing the following procedure: (1) determining Tbest1, wherein Tbest1 is the total number of the received area code measurement reports in which an area code identifier that identifies a first area code is associated with the highest sign quality value; (2) determining Tbest2, wherein Tbest2 is the total number of the received area code measurement reports in which an area code identifier that identifies a second area code is associated with the highest sign quality value; and (3) determining whether Tbest1 is greater than Tbest2. More generally, the procedure includes: determining Tbestn, for n=1, . . . , N, wherein N is the number of unique area codes identified by the plurality of area code identifiers and Tbestn is the total number of the received area code measurement reports in which an area code identifier that identifies the nth area code is associated with the highest sign quality value; and determining max (Tbest1, . . . , TbestN); and selecting the area code corresponding to max(Tbest1, . . . TbestN).

Figure 3:
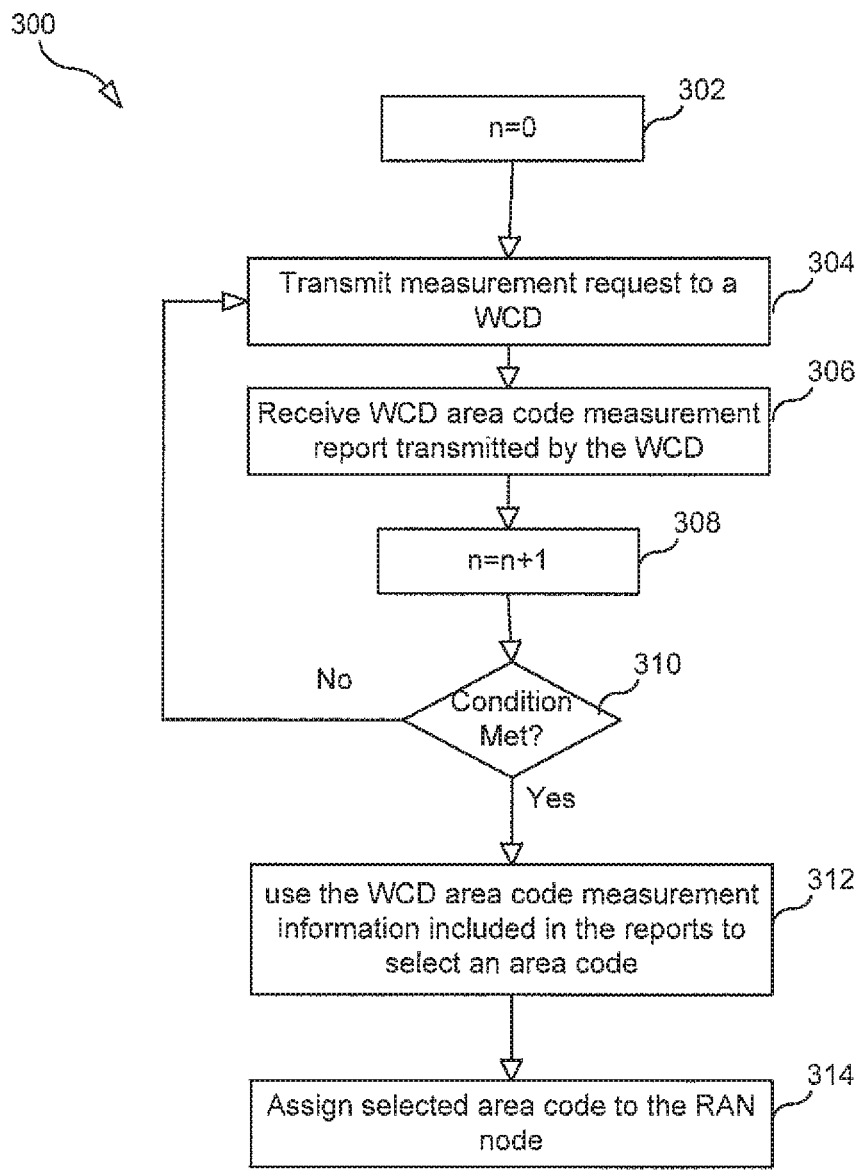

FIG. 3 is a flow chart illustrating an example process 300 for automatically assigning an area code to RAN 102. In this example, process 300 is performed by RAN node 102.

In step 302, a variable n is initialized. This variable is used to keep count of the number of WCD area code measurement reports received by RAN node 102.

In step 304, RAN node 102 transmits to a WCD (e.g., any WCD in communication with RAN node 102) a control message comprising reporting information (i.e., information for configuring the WCD to transmit to RAN node 102 one or more area code measurement reports). This message may be a Radio Resource Control (RRC) message, such as an RRC Connection Reconfiguration message. In response to receiving the message, the WCD transmits one or more area code measurement reports. In some embodiments, WCDs are configured to transmit WCD area code measurement reports without RAN node 102 having to address a message to the WCD. For example, the WCDs may be configured to transmit the area code measurement reports based on information broadcast by RAN node 102.

In step 306, RAN node 102 receives the one or more area code measurement reports transmitted by the WCD.

In step 308, n is incremented.

In step 310, RAN node determines whether a condition is met (e.g., whether N is greater than a threshold (T)). If the condition is met (e.g., n is greater than T), the process proceeds to step 312, otherwise it proceeds back to step 304. In some embodiments, when the condition has been met (e.g., n is greater than T), this means RAN node 102 has a sufficient number of area code measurement reports to select an area code based on the WCD area code measurement information included in the reports.

In step 312, RAN node 102 uses the WCD area code measurement information included in the reports to select an area code. For the sake of illustration assume that RAN node 102 received ten area code measurement reports and each report only included one area code identifier. In step 312, RAN node 102 may determine the specific area code identifier that was included in the greatest number of reports and then select this area code identifier. For example, if area code identifier "ACID-7" was included in 6 of the ten reports, then this area code identifier is chosen because it is the area code identifier that is included in the greatest number of the received reports. If the selected area code identifier is not itself an area code, then RAN node 102 determines the area code corresponding to the selected area code identifier and then selects this area code.

In step 314, the selected area code is assigned to RAN node 102.

Figure 4:
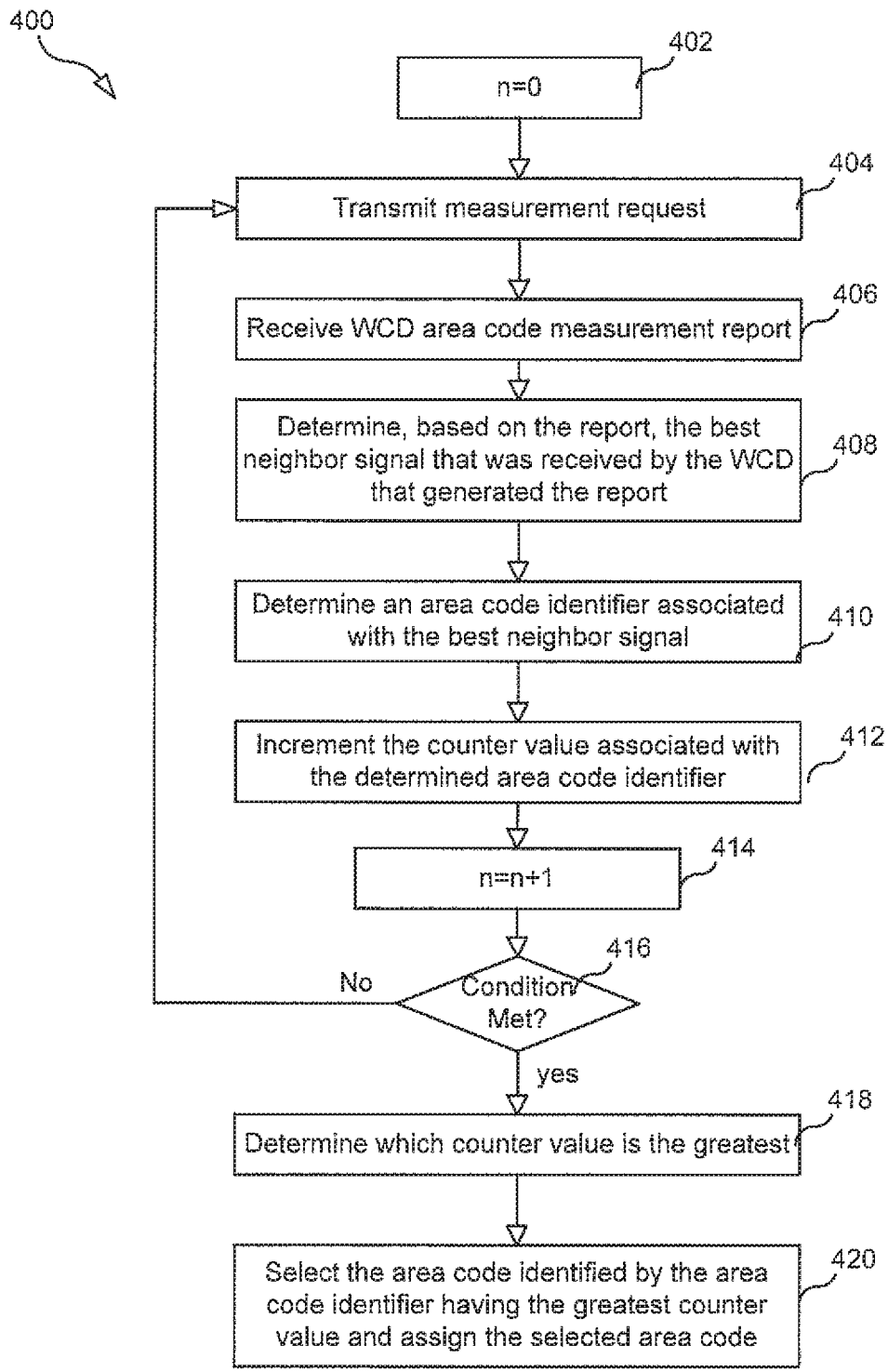

FIG. 4 is a flow chart illustrating an example process 400 for automatically assigning an area code to RAN 102. In this example, process 400 is performed by RAN node 102.

In step 402, a variable n is initialized. This variable is used to keep count of the number of WCD area code measurement reports received by RAN node 102.

In step 404, RAN node 102 transmits to a WCD (e.g., any WCD that is in communication with RAN node 102) a message for configuring the WCD to transmit to RAN node 102 one or more area code measurement reports. This message may be a Radio Resource Control (RRC) message, such as an RRC Connection Reconfiguration message. In response to receiving the message, the WCD transmits one or more area code measurement reports.

In step 406, RAN node 102 receives the one or more area code measurement reports transmitted by the WCD.

In step 408, RAN node 102 determines, based on the report, the best neighbor signal that was detected by the WCD that generated the report. For instance, the received report may include, for each neighbor signal detected by the WCD, a signal quality value representing the quality (e.g., strength) of the detected signal. Hence, RAN node 102 may determine the best neighbor signal by determining the best signal quality value.

In step 410, RAN node 102 determines an area code identifier associated with the best neighbor signal. The report may also include, for each signal quality value, an area code identifier associated with the signal quality value.

In step 412, RAN node 102 increments a counter value associated with the determined area code identifier. This counter value is used to keep track of the number of times the area code identifier associated with the counter value was associated with the best neighbor signal.

In step 414, n is incremented.

In step 416, RAN node determines whether a condition is met (e.g., whether N is greater than a threshold (T)). If the condition is met (e.g., n is greater than T), the process proceeds to step 418, otherwise it proceeds back to step 404.

In step 418, RAN node 102 determine which counter value is the greatest

In step 420, RAN node selects the area code corresponding to the area code identifier associated with the greatest counter value and assigns the selected area code to RAN node 102.

Figure 5:
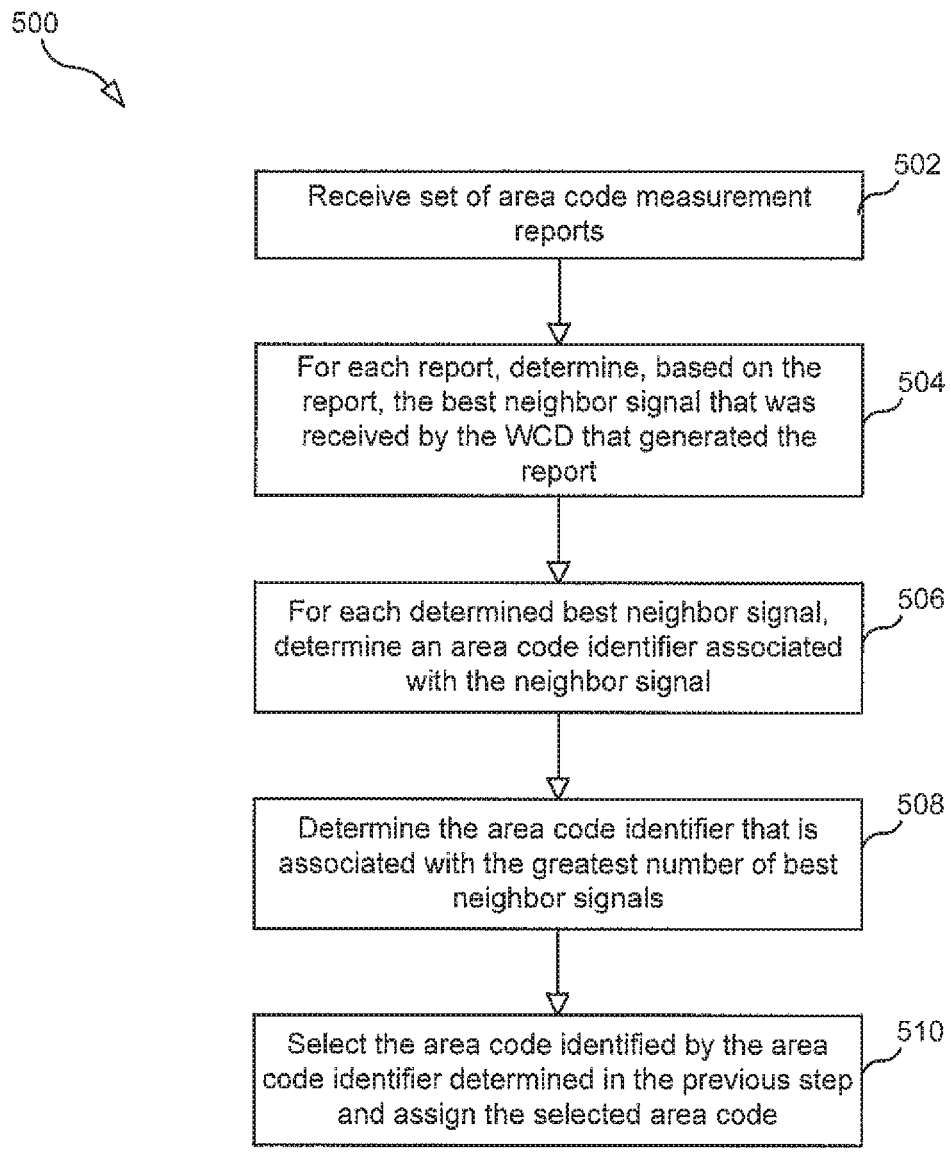

FIG. 5 is a flow chart illustrating an example process 500 for automatically assigning an area code to RAN 102. In this example, process 500 is performed by server 108.

In step 502, server 108 receives set of area code measurement reports. In one embodiments, the set of reports were received by RAN node 102 from one or more WCDs and were transmitted to server 108 by RAN node 102.

In step 504, server 108, for each report, determines, based on the report, the best neighbor signal that was received by the WCD that generated the report.

In step 506, server 108, for each determined best neighbor signal, determine an area code identifier associated with the neighbor signal.

In step 508, server 108 determines the area code identifier that is associated with the greatest number of best neighbor signals.

In step 510, server 108 select the area code identified by the area code identifier determined in the previous step and assigns the selected area code to RAN node 102.

According to some embodiments, the term server refers to a single computing device (single general purpose computer) that is configured via software and/or hardware to provide one or more services or it may refer to a set of computing devices (e.g., a cloud computing system) that are configured via software and/or hardware to function together to provide the one or more services. For example, the software for implementing the function of server 108 may be implemented on a single computer or distributed over a plurality of computers.

Figure 6:
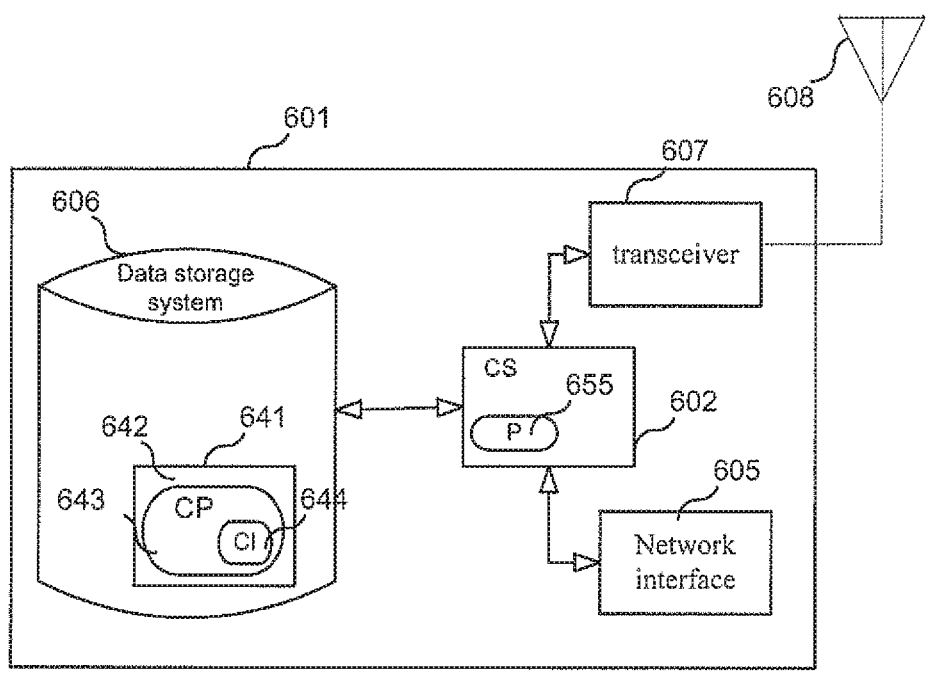
FIG. 6 is a block diagram of a RAN node according to some embodiments.

FIG. 6 is a block diagram of an embodiment of an apparatus 601 for implementing RAN node 102 (i.e., RAN node 102 may include apparatus 601). As shown in FIG. 6, apparatus 601 may include: a computer system (CS) 602, which may include one or more processors 655 (e.g., a general purpose microprocessor and/or one or more other data processing circuits, such as an application specific integrated circuit (ASIC), field-programmable gate arrays (FPGAs), and the like); a network interface 605 for use in connecting the RAN node to a network (e.g., network 110) and for use in communicating with other units connected to the network; a transceiver 607 coupled to an antenna 608 for wirelessly communicating with WCDs; and a data storage system 606 for storing information (e.g., measurement reports), which may include one or more non-volatile storage devices and/or one or more volatile storage devices (e.g., random access memory (RAM)). In embodiments where computer system 602 includes a general purpose microprocessor, a computer program product (CPP) 641 may be provided. CPP 641 includes a computer readable medium (CRM) 642 storing a computer program (CP) 643 comprising computer instructions (CI) 644. CRM 642 may be a non-transitory computer readable medium (i.e., magnetic media (e.g., a hard disk), optical media (e.g., a DVD), flash memory, and the like). In some embodiments, the CI 644 of computer program 643 is configured such that when executed by computer system 602, the CI causes the computer system to perform steps described herein. In other embodiments, computer system 602 may consist merely of one or more ASICs. Hence, the features of the embodiments described herein may be implemented in hardware and/or software.

Figure 7:
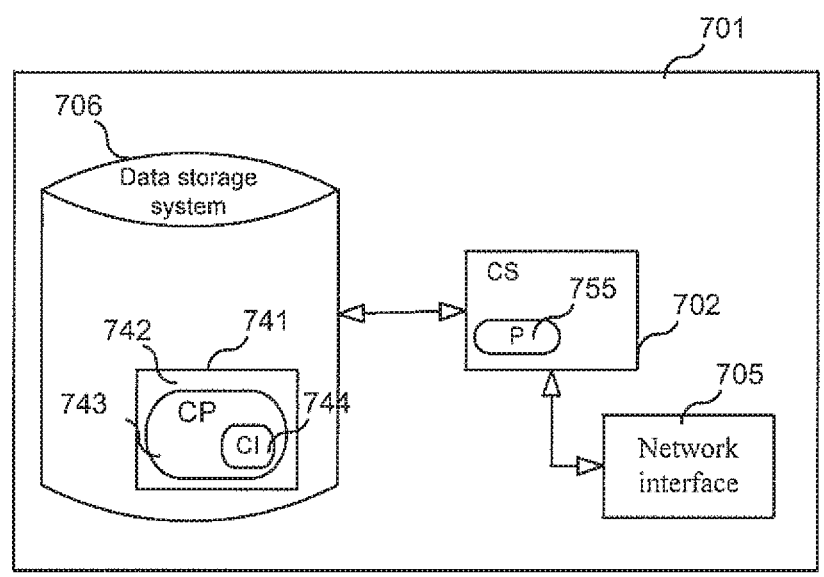
FIG. 7 is a block diagram of a server according to some embodiments.

FIG. 7 is a block diagram of an embodiment of an apparatus 701 for implementing server 108 (i.e., server 108 may include apparatus 701). As shown in FIG. 7, apparatus 701 may include: a computer system (CS) 702, which may include one or more processors 755 (e.g., a general purpose microprocessor and/or one or more other data processing circuits, such as an application specific integrated circuit (ASIC), field-programmable gate arrays (FPGAs), and the like); a network interface 705 for use in connecting the server 108 to a network (e.g., network 110) and for use in communicating with other units connected to the network; and a data storage system 706 for storing information (e.g., measurement reports), which may include one or more non-volatile storage devices and/or one or more volatile storage devices (e.g., random access memory (RAM)). In embodiments where computer system 702 includes a general purpose microprocessor, a computer program product (CPP) 741 may be provided. CPP 741 includes a computer readable medium (CRM) 742 storing a computer program (CP) 743 comprising computer instructions (CI) 744. CRM 742 may be a non-transitory computer readable medium (i.e., magnetic media (e.g., a hard disk), optical media (e.g., a DVD), flash memory, and the like). In some embodiments, the CI 744 of computer program 743 is configured such that when executed by computer system 702, the CI causes the computer system to perform steps described herein. In other embodiments, computer system 702 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for automatically assigning an area code to a first radio access network (RAN) node, the method comprising:

obtaining, at one time or over a period of time, wireless communication device (WCD) area code measurement information generated by one or more WCDs based on detection of one or more signals transmitted by one or more RAN nodes neighboring the first RAN node;

using the WCD area code measurement information to select an area code for the first RAN node; and assigning the selected area code to the first RAN node, wherein the WCD area code measurement information comprises a plurality of area code identifiers, and each area code identifier included in the plurality of area code identifiers is: a cell identifier identifying a cell of a cellular network, a node identifier identifying a RAN node, or an antenna identifier identifying an antenna transmission point.

2. The method of claim 1, wherein the step of obtaining the WCD area code measurement information comprises the first RAN node receiving, over a period of time, a plurality of area code measurement reports, wherein each one of the area code measurement reports was transmitted by a WCD after the WCD received reporting information transmitted by the first RAN node.

3. The method of claim 1, wherein
the first RAN node uses the WCD area code measurement information to select the area code,
the first RAN node assigns the selected area code to itself, and
the first RAN node informs another node that the first RAN node has assigned the selected area code to itself.

4. The method of claim 1, wherein
the step of obtaining the WCD area code measurement information comprises a server receiving the WCD area code measurement information from the first RAN node, and
the step of using the WCD area code measurement information to select an area code is performed by the server.

5. The method of claim 1, wherein a temporary area code is assigned to the first RAN node before the selected area code is assigned to the first RAN node.

6. The method of claim 5, wherein assigning the selected area code to the first RAN node comprises a server transmitting to the first RAN node an instruction for causing the first RAN node to cease using the temporary area code and begin using the selected area code.

7. The method of claim 5, further comprising the first RAN node receiving from a server an instruction for causing the first RAN node to cease using the temporary area code and begin using the selected area code.

8. The method of claim 1, wherein the selected area code is a tracking area code (TAC) for use by RAN nodes and/or core network nodes in tracking the geographic location of WCDs.

9. The method of claim 1, wherein the step of using the WCD area code measurement information to select an area code comprises determining T1, wherein T1 is a total number of area code identifiers included in the plurality of area code identifiers that identifies a first area code, or T1 is a number of area code measurement reports indicating the first area code as being received with highest signal strength or best signal quality.

10. The method of claim 9, wherein the step of using the WCD area code measurement information to select an area code comprises determining T2, wherein T2 is a total number of area code identifiers included in the plurality of area code identifiers that identifies a second area code, or T2 is a number of area code measurement reports indicating the second area code as being received with highest signal strength or best signal quality.

11. The method of claim 10, wherein using the WCD area code measurement information to select the first area code further comprises determining that T1 is greater than T2.

12. The method of claim 1, wherein
the step of using the WCD area code measurement information to select an area code comprises selecting an area code identifier included in the plurality of area code identifiers, and
the method further comprises the first RAN node, after selecting the area code identifier, transmitting to a server an area code request requesting an area code corresponding to the selected area code identifier.

13. The method of claim 1, wherein the method further comprises the first RAN node broadcasting system information comprising reporting information.

14. The method of claim 1, wherein the method further comprises the first RAN node transmitting a specific WCD a control message comprising reporting information for the specific WCD.

15. A non-transitory computer readable medium storing a computer program comprising computer instructions for performing the method of claim 1.

16. An apparatus for automatically assigning an area code to a first radio access network (RAN) node, the apparatus comprising:
a data storage system; and
a computer system, comprising a processor, coupled to the data storage system, wherein the apparatus is configured to:
use wireless communication device (WCD) area code measurement information generated by one or more WCDs based on detection of one or more signals transmitted by one or more RAN nodes neighboring the first RAN node to select an area code for the first RAN node; and
assign the selected area code to the first RAN node, wherein
the WCD area code measurement information comprises a plurality of area code identifiers, and
each area code identifier included in the plurality of area code identifiers is: a cell identifier identifying a cell of a cellular network, a node identifier identifying a RAN node, or an antenna identifier identifying an antenna transmission point.

17. A radio access network (RAN) node, comprising:
a transceiver for transmitting reporting information and for receiving a plurality of area code measurement reports, wherein each one of the area code measurement reports was transmitted by a WCD after the WCD received reporting information transmitted by the first RAN node; and
the apparatus of claim 16.

18. The RAN node of claim 17, wherein the RAN node is further configured to:
assign the selected area code to itself, and
inform another node that the RAN node has assigned the selected area code to itself.

19. A server for automatically assigning the selected area code to the first RAN node, the server comprising:
the apparatus of claim 16; and
a network interface for receiving WCD measurement information from a RAN node.

20. The server of claim 19, wherein the server is configured to assign a selected area code to a RAN node by transmitting to the RAN node an instruction for causing the RAN node to cease using a temporary area code and begin using the selected area code.

21. A method for automatically assigning an area code to a first radio access network (RAN) node, the method comprising:
obtaining first information comprising a first area code identifier and first signal quality data, wherein the first information is generated by a wireless communication device (WCD) based on detection of signals received from RAN nodes neighboring the first RAN node;

obtaining second information comprising a second area code identifier and second signal quality data, wherein the second information is generated by the WCD based on detection of signals received from RAN nodes neighboring the first RAN node;

comparing the first signal quality data against the second signal quality data;

selecting one of the first area code identifier and the second area code identifier based on a result of the comparison; and assigning an area code to the first RAN, based on the selected area code identifier.

22. The method of claim 21, wherein each of the first area code identifier and the second area code identifier is: a cell identifier identifying a cell of a cellular network, a node identifier identifying a RAN node, or an antenna identifier identifying an antenna transmission point.

23. The method of claim 21, wherein each of the first area code identifier and the second area code identifier is: a cell identifier identifying a cell of a cellular network, a node identifier identifying a RAN node, or an antenna identifier identifying an antenna transmission point, the method further comprises the first RAN node, after selecting one of the first area code identifier and the second area code identifier, transmitting to a server an area code request requesting the area code corresponding to the selected area code identifier.

* * * * *